United States Patent [19]

Singh et al.

[11] 3,883,153

[45] May 13, 1975

[54] APPARATUS FOR SUPPRESSING SPRING ACTION BETWEEN THE WHEEL MOUNTS AND FRAME OF A VEHICLE

[76] Inventors: Bhupindar Singh, 18678 Cumnoch Pl., Northridge, Calif. 91324; Donald A. Swauger, 20616 Blackhawk St., Chatsworth, Calif. 91311

[22] Filed: June 25, 1973

[21] Appl. No.: 372,962

[52] U.S. Cl.............. 280/124 R; 188/67; 267/9 B
[51] Int. Cl............................................. B60g 13/02
[58] Field of Search....... 280/124 R; 188/67, 106 R, 188/129; 267/9 R, 9 B, 9 C

[56] References Cited
UNITED STATES PATENTS

| | | | |
|---|---|---|---|
| 3,539,197 | 11/1970 | Remaud | 280/104 |
| 3,690,413 | 9/1972 | Airheart | 188/67 |

*Primary Examiner*—Philip Goodman
*Assistant Examiner*—John A. Carroll

[57] ABSTRACT

Apparatus for cancelling out and/or suppressing the spring action between the wheel mounts and frame of a vehicle and means for manually setting the apparatus in an operative or non-operative condition as desired. This apparatus entails a strut bar between each wheel mount and the chassis of the vehicle and means on the chassis embracing each such struct bar for grippingly engaging the strut bar to prevent its motion relative to the chassis whereby the wheel mounts become affixed relative to the frame and chassis of the vehicle. The means for grippingly engaging each strut bar includes a caliper type braking clamp for each of such bars and an hydraulic brake actuating system for operating such braking clamps. This may include a bypass line from the conventional hydraulic braking system of the vehicle and means for locking such bypass line in brake actuating condition.

10 Claims, 5 Drawing Figures

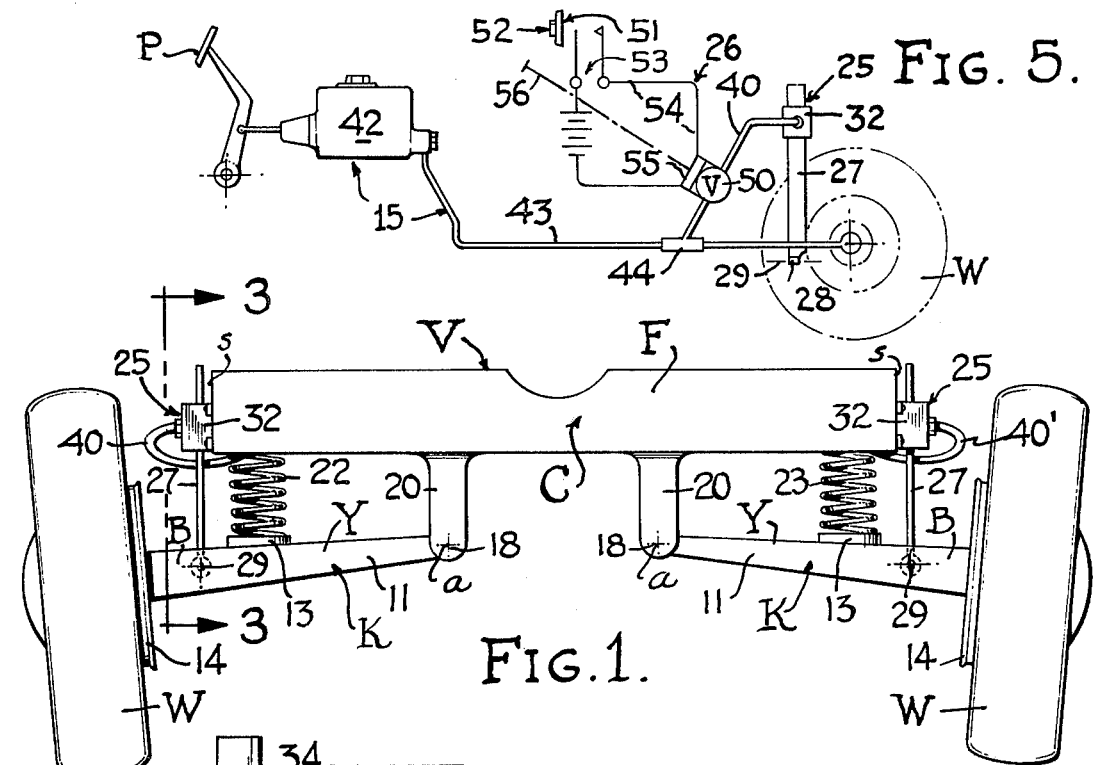
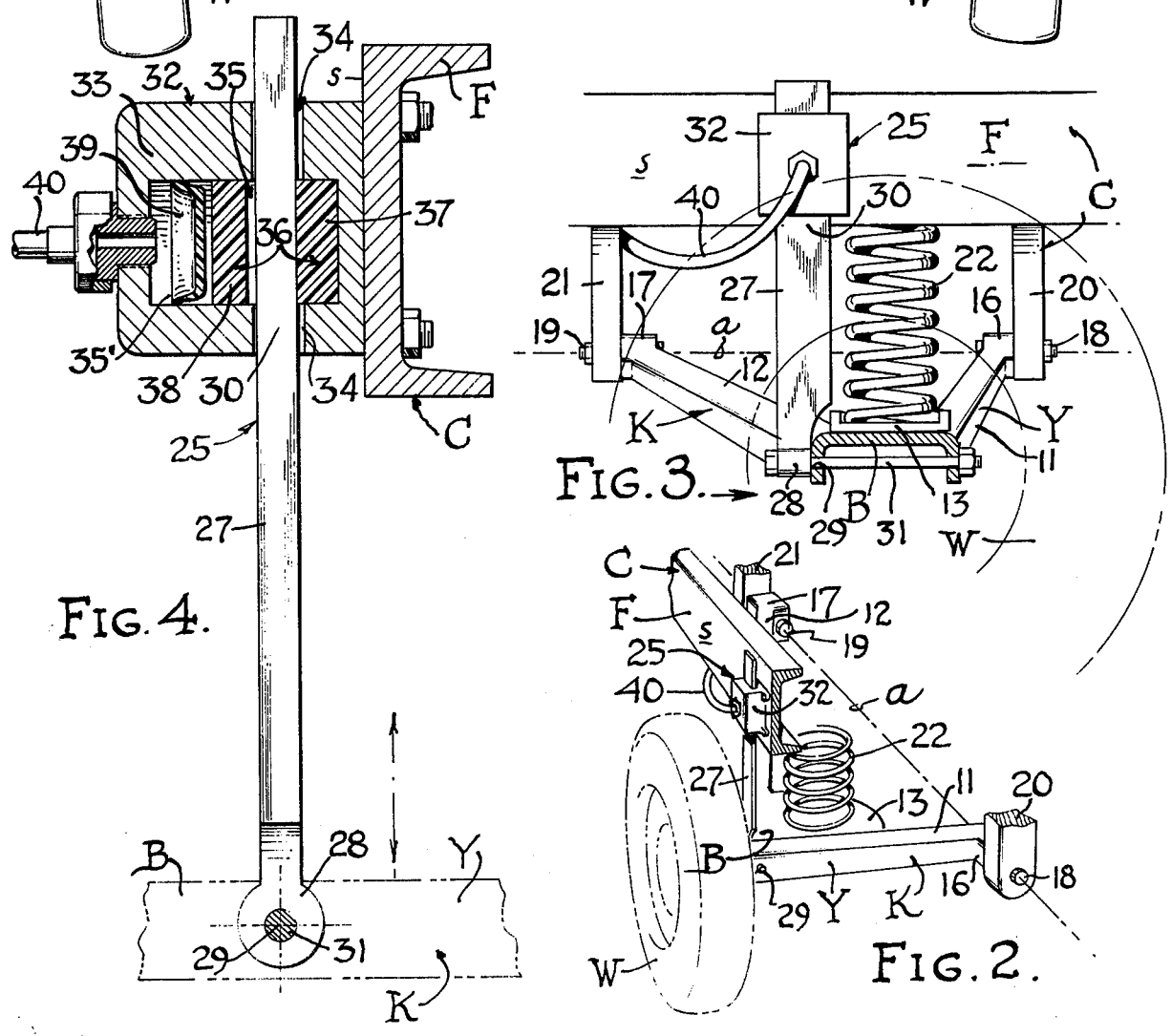

3,883,153

APPARATUS FOR SUPPRESSING SPRING ACTION BETWEEN THE WHEEL MOUNTS AND FRAME OF A VEHICLE

BACKGROUND

This invention relates to apparatus for preventing the normal spring action between the wheel mounts and chassis of a vehicle and more particularly to a spring suppressor for stabilizing two or more of the wheel mounts of the vehicle under driving conditions if desired. More specifically this invention relates to a spring suppressor for preventing dipping of the front end of a vehicle during braking action thereof.

We are not aware of any existing mechanisms for accomplishing the purpose and action required to stabilize the normal spring action of a vehicle as contemplated by the present invention.

STATEMENT OF THE INVENTION

This invention basically seeks to overcome the tendency for the front end of an automotive vehicle to dip during application of the brakes of such vehicle. It is not uncommon, even at relatively slow speeds, for the whole frame and body of a vehicle to tilt forward due to the momentum of a running vehicle when stopped abruptly. This puts extreme pressure on the front springs of the vehicle and causes the whole front end to dip momentarily. During such lowering of the front end of a vehicle, the front bumper thereof is below the normal or standard heighth of bumpers relative to the pavement. As a result such lowered bumper is forced below the bumper of a vehicle ahead and becomes locked thereunder. Moreover, the grill and radiator as well as the front lights of the vehicle are so disposed, in such lowered condition, as to be damaged upon impact with the bumper of the vehicle ahead. Any excessive damage thus created causes an increase in insurance rates. Any lesser (deductable) damages are borne by the vehicle owner.

Accordingly it is an object of this invention to provide a device for preventing depression of the front springs of a vehicle. In this connection it is an object to provide a mechanism and apparatus allowing normal spring action during conventional running speeds of a vehicle but coordinated with the braking action so as to cancel out or suppress such normal spring action upon application of the brakes to stop or slow-down the vehicle.

It is another object of this invention to provide a strut member between the chassis and the spring loaded axle mount of a vehicle and means for locking the strut in fixed relation to the chassis to prevent movement of the spring loaded axle mount relative thereto. In this connection it is an object to provide a slidable connection between such strut and the chassis including a brake-operated clamp for gripping the strut to prevent its sliding movement through the slidable connection.

For purposes of this invention it is an object thereof to provide an hydraulically operated caliper type braking clamp for gripping the strut, and an hydraulic brake system for automatically operating the caliper type braking clamp from the drivers compartment or cab of the vehicle.

It is a further object to provide a bypass conduit in the hydraulic braking system of the vehicle for automatically operating the caliper type clamps simultaneously with the normal braking action of the vehicle.

This object contemplates a valve in such bypass line and means for manually closing such valve to lock the hydraulically operated caliper braking clamp in strut gripping condition. This object further contemplates a remote control for such manually operated valve so as to enable closing and/or opening thereof at will from the driver's seat or cab of the vehicle.

These and other objects of the present invention will become apparent from a reading of the following description and claims in the light of the accompanying single sheet of drawing in which:

FIG. 1 shows the front end of a vehicle;

FIG. 2 is a fragmentary perspective of one wheel and spring mount of FIG. 1;

FIG. 3 is a side elevation of the spring suppressor of the present invention as seen from line 3—3 in FIG. 1;

FIG. 4 is a vertical section through FIG. 3 of the spring suppressor; and

FIG. 5 is a schematic diagram of an hydraulic braking system embodying the spring suppressor of the present invention.

GENERAL DESCRIPTION

Referring to FIGS. 1 and 2, the front end of a vehicle V is shown to include a chassis C as a supporting frame F for a vehicle body. The front wheels W are shown to be supported on the chassis C by a knee-action type wheel mount K. Each such knee-action mount K usually includes a yoke Y having a pair of arms 11 and 12 diverging from a base B. The axle and wheel bearings (not shown) extend from the base B of the yoke Y. the wheels W include the usual brake drums 14 with shoes or discs (not shown) operable by hydraulic braking means (not shown) in an hydraulic brake system 15 shown schematically in FIG. 5.

Each knee-action mount K includes a pair of bosses 16–17 at the ends of the yoke arms 11 and 12, respectively. These bosses 16–17 have aligned bores on axes -a- through which pinion bolts 18–19 extend for pivotal connection to brackets 20 and 21, respectively, formed as an integral part of the frame F of the chassis C in a conventional manner. Each knee-action mount K further includes a pad 13 for a spring 22 or 23 for the respective yoke. Each spring 22–23 has its lower end secured to the pad 13 of the respective yoke Y and its upper end secured to the frame F of the chassis C of the vehicle V. These springs 22 and 23 are calibrated to afford articulation of the knee-action wheel mount relative to the frame for the chassis C in the usual manner.

DETAILED DESCRIPTION

The present invention comprises a spring suppressor 25 arranged between the yoke Y of each of the knee-action mounts K and the frame F of the chassis C and means 26 operatively connected to the hydraulic braking system 15 of the vehicle V for electively controlling the spring suppressors 25 during normal operation of the vehicle.

Each spring suppressor 25 is of identical structure and like numerals therefor indicate like parts thereof. The suppressors 25 each include a strut 27 having one end 28 pivotally connected as at 29 to the yoke Y between the pad 13 thereof and the wheel W mounted on the outer end of the knee-action mounts K. The opposite end 30 of the strut 27 extends upwardly from the yoke in substantially parallel relation to the side wall s of the frame F above the yoke Y. In the present disclosure, the strut 27 is shown to be adjacent the outer side of the vehicle chassis C and the pivotal connection 29 as a bolt 31 extending through the base B of the yoke Y in parallel relation to the axes *a* of the pinion bolts 18-19 of the knee-action wheel mount K. The exact location of the strut relative to the frame F is not to be limited because it merely must be movable through a sleeve-like structure 32 secured to the frame F for purposes of the present invention.

The sleeve-like structure 32 in accordance with the present invention is secured to the frame F by bolts, rivets and the like or may be a permanent part integral to the frame F as desired.

The sleeve-like structure 32 consists of a housing 33 through which the strut may pass. As best seen in FIG. 4, the housing 33 of the sleeve-like structure 32 has a passage 34 formed therethrough in alignment with the upwardly extending strut 27. The arrangement is such that the upper end 30 of the strut 27 is freely slidable for up and down movement through the structure 32 during articulation of the yoke and normal spring action of the knee-action mount K.

The housing 33 of the structure 32 has a chamber 35 formed therein transversely of the passage 34 and strut 27 extending therethrough. A caliper type brake 36 disposed in the chamber 35 includes a pair of brake shoes 37–38 which embrace the strut 27. One of the shoes 37 disposed at the base end of the chamber 35 is stationary and adjacent the chassis side of the strut 27. The other shoe 38 is arranged in the outer end of the chamber 35 for sliding movement toward and from the opposite, outer side of the strut 27. The outer end of the chamber 35 serves as an hydraulic cylinder 35' and has a piston 39 disposed therein on the outer side of the movable shoe 38.

The hydraulic cylinder end 35' of the chamber 35 has communication with the hydraulic brake system 15 of the vehicle V via a bypass conduit 40 (FIGS. 3, 4 and 5). The hydraulic brake system 15 includes the usual shoe operative cylinders (not shown) with the brake drum 14 of each wheel mount K. The shoe operative cylinders in the drums 14 are each communicated with a master cylinder 42 via separate conduits 43. Each of these conduits 43 have a take-off fitting 44 for connection to the bypass 40 or 40' of the particular caliper type brake 36 for the respective spring suppressor 25 of each wheel mount K. The arrangement is such that when the brake pedal P of the vehicle V is operated to apply brake action to the drums 14, a similar brake action occurs in each of the hydraulic cylinder ends 35' of the chambers 35 in the caliper type brakes 36. By this action, the pistons 39 are forced against the adjacent movable shoe 38 in each caliper type brake 36. The movable shoes 38 are thus forced against the strut members 27 and the latter grippingly forced against the respective stationary shoe 37 of the caliper brakes.

From the foregoing it will be appreciated that upon application of the brakes of the vehicle in the normal fashion, the struts 27 of each spring suppressor 25 is firmly gripped to prevent its up and down movement in response to spring action. Consequently, no spring action can take place and each knee-action wheel mount K becomes affixed relative to the frame F of the chassis C of the vehicle V. As a result of this suppression of the normal spring action, no dip or lowering of the front end of the vehicle V can occur. Accordingly, the front bumper of the vehicle V will remain at normal elevation above the pavement for straight-on engagement with an abutment, another vehicle or the bumper thereof. This will usually minimize damage to each of the colliding vehicles, especially during so called "rear enders" and afford better bumper action between such vehicles.

The spring suppressor 25 of the present invention has further advantages such as enabling the driver to lock the front wheel mounts K in fixed relation to the chassis under certain driving conditions. For example, in the case of police officers or highway patrol cars giving chase. It is advantageous to lock the front end spring mounts on a straight-away of smooth highway pavement. It stabilizes the vehicle during high speed and on turns so that the police officers have better control and advantages, although deprived of the comfort of normal spring action.

As depicted in FIG. 5, means for locking the spring suppressors 25 in fixed relation to the vehicle chassis C includes a valve 50 in the bypass conduit 40 and means 51 for manually closing such valve 50 at the option of the driver of the vehicle V.

The means 51 for closing the valve 50 is preferably remotely controlled from the dashboard in the driver's compartment or cab of the vehicle V. This includes a push button 52 or a key operated switch 53 on the dashboard and in a circuit 54 with a coil or element (not shown) of a solenoid 55 operatively associated with the valve 50. As an alternative, if a push button switch were to be used in place of the key operated switch 53, a holding relay having its coil in the circuit 54 may be interposed therein to operate the solenoid valve 50 to hold the latter in closed condition until released intentionally by manual means of a rod 56 at the dashboard of the vehicle.

In either event, the solenoid valves 50 are manually operated, although remotely, to either open and/or close the flow of fluid through the bypass conduits 40. By this arrangement, the driver of the vehicle has several options. He may decide not to use the spring suppressors 25 at all by merely shutting off the valves 50 so that no hydraulic fluid of the system 15 can flow to effect operation of the caliper type brakes 36. He may leave the valves 50 and bypass conduit 40 open and ready for operating the caliper type brakes 36 automatically and instantly upon application of the normal braking system 15. Once the caliper type brakes 36 are disposed in gripping relation with their respective strut 27, the valve 50 may be shut-off to hold the fluid under pressure within the cylinder end 35' of chamber 35 to lock the struts in fixed relation. This locks the knee-action spring mounts K in fixed relation to the frame F of the chassis C of the vehicle V. No spring action can then occur until the fluid is relieved of pressure within the chambers 35' by opening of the valves 50.

The spring suppressor apparatus of the present invention is equally applicable to the spring mounts for the rear wheels of a vehicle for the purpose of securing the rear axles in fixed relation to the chassis of the vehicle. Such an arrangement might be desirable in case of a passenger vehicle towing a trailer by coupling thereof with a trailer hitch. This would prevent the rear springs of such pulling vehicle from being weighed down due to the thrust applied thereto from the trailer via the trailer hitch on the rear bumper and frame of the towing vehicle.

This arrangement may be equally advantageous in the case of camper type vehicle when it is desirous of keeping the body thereof from bouncing up and down or rocking to and fro in some situations. It is conceivable that the rear axles and spring mounts therefor may have sets of spring suppressors of the present invention associated therewith in a hydraulic system independent of the standard hydraulic brake actuating system of the vehicle. Thus the rear springs of the vehicle could be suppressed and the struts locked in place separate and independent from the ones associated with the front wheel spring mounts of the vehicle.

Having thus described our spring suppressor for vehicles in specific detail it will be appreciated by those skilled in the art that the same may be susceptible to variations, alterations and/or modifications without departing from the spirit or scope of the invention as set forth in the appended claims.

What we claim as new and desire to protect by Letters Patent is:

1. In combination with a spring mount for a wheel which is normally articulatable relative to the frame of a vehicle and an hydraulic braking system of such vehicle, a spring suppressor comprising:
   1. a housing secured to the frame of such vehicle and having a passage formed therethrough;
   2. a strut member having one end pivotally connected to such spring mount and its opposite end arranged for free sliding movement through the passage through said housing during normal articulation of the spring mount;
   3. an hydraulically operated caliper type brake in said housing including a pair of brake shoes embracing said strut therein; and
   4. an hydraulic brake operating system in said vehicle communicating with said hydraulically operated caliper type brake for urging the brake shoes thereof into gripping engagement with said strut to thereby render the spring mounts of the vehicle in fixed relation relative to the frame of the vehicle.

2. The spring suppressor in accordance with that of claim 1 including a bypass conduit means communicating the hydraulic braking system of such vehicle with said hydraulically operated caliper type brake within said housing for urging the brake shoes within the latter into gripping engagement with said strut during normal braking operation of the hydraulic braking system of the vehicle to thereby render the spring mounts of the vehicle in fixed, non-articulatable relation relative to the frame of the vehicle.

3. The spring suppressor in accordance with that of claim 1 including means for locking the brake shoes of said caliper type brake in gripping relation relative to said strut.

4. The spring suppressor in accordance with that of claim 3 in which said means for locking the brake shoes of said caliper type brake in gripping relation relative to said strut comprises:

1. a valve in said bypass conduit means; and
2. means for manually controlling the opening and closing of said valve.

5. The spring suppressor in accordance with that of claim 4 in which said valve is a solenoid operated valve and said means for manually controlling the latter comprises:
   1. an electrical circuit connected to the solenoid of said solenoid operated valve; and
   2. a switch means in said circuit remote from said valve and in the driver's compartment of such vehicle for operating said valve.

6. The spring suppressor in accordance with that of claim 5 including means for holding said circuit in operating condition of said valve after braking action of said vehicle to thereby lock the brake shoes of said caliper type brake in gripping relation relative to said strut.

7. The spring suppressor in accordance with that of claim 2 in which said caliper type brake comprises:
   1. a stationary brake shoe arranged in said housing on one side of said strut;
   2. a movable brake shoe arranged in said housing on the opposite side of said strut;
   3. an hydraulic cylinder formed in said housing remote from said stationary shoe and exposed to said movable shoe;
   4. a piston arranged in the hydraulic cylinder with said bypass conduit means remote from said piston and movable brake shoe for urging the latter toward said strut and stationary brake shoe upon application of the brakes of such vehicle via the hydraulic braking system thereof.

8. The spring suppressor in accordance with that of claim 7 including means for locking the brake shoes of said caliper type brake in gripping relation relative to said strut.

9. The spring suppressor in accordance with that of claim 8 in which said means for locking the brake shoes of said caliper type brake in gripping relation relative to said strut comprises:
   1. a valve in said bypass conduit means; and
   2. means for manually controlling the opening and closing of said valve.

10. The spring suppressor in accordance with that of claim 9 in which said valve is a solenoid operated valve and said means for manually controlling the latter comprises:
    1. an electrical circuit connected to the solenoid of said solenoid operated valve;
    2. a switch means in said circuit remote from said valve and in the driver's compartment of such vehicle for operating said valve; and
    3. means for holding said circuit in operating condition of said valve after braking action of said vehicle to thereby lock the brake shoes of said caliper type brake in gripping relation relative to said strut.

* * * * *